United States Patent [19]

Brislawn et al.

[11] 4,431,149

[45] Feb. 14, 1984

[54] GEARED TAB

[75] Inventors: Mark G. Brislawn, Orange; David W. Bryant, Tustin; Gerald A. Rayburn, Garden Grove, all of Calif.

[73] Assignee: The United States of America as represented by the Secretary of the Air Force, Washington, D.C.

[21] Appl. No.: 347,807

[22] Filed: Feb. 11, 1982

[51] Int. Cl.³ .......................... B64C 9/04; B64C 9/10
[52] U.S. Cl. ................................. 244/75 R; 244/82; 244/90 R; 244/87
[58] Field of Search .................... 244/75 R, 82, 90 R, 244/90 B, 87, 89, 213, 215

[56] References Cited

U.S. PATENT DOCUMENTS

| 2,207,387 | 7/1940 | Tampier | 244/83 |
|---|---|---|---|
| 2,357,465 | 9/1944 | Focht | 244/90 R |
| 2,370,844 | 3/1945 | Davis | 244/82 |
| 2,395,671 | 2/1946 | Kleinhans et al. | 244/82 |
| 2,517,680 | 8/1950 | Knowler et al. | 244/85 |
| 2,557,426 | 6/1951 | George | 244/82 |
| 2,696,956 | 12/1954 | Farr et al. | 244/83 |
| 3,000,595 | 9/1961 | Dorn | 244/82 |
| 3,020,008 | 2/1962 | Rumsey | 244/85 |
| 3,295,797 | 1/1967 | Roberts et al. | 244/82 |
| 3,704,843 | 12/1972 | Jenny | 244/85 |
| 3,785,596 | 1/1974 | Chinchester-Miles | 244/83 R |

FOREIGN PATENT DOCUMENTS 741711 11/1943 Fed. Rep. of Germany ........ 244/82

Primary Examiner—Galen L. Barefoot
Attorney, Agent, or Firm—Donald J. Singer; Bobby D. Scearce

[57] ABSTRACT

An improved geared tab configuration for a moveable airfoil, such as an elevator of an aircraft, is provided which comprises a tab pivotally connected to the airfoil, and linkage connecting the airfoil to the tab for simultaneous opposing pivotal movement of the tab relative to the airfoil to a maximum tab deflection at a determinable intermediate upward airfoil deflection beyond which the relative tab deflection reverses and fairs to the airfoil at a determinable maximum upward airfoil deflection.

3 Claims, 3 Drawing Figures

GEARED TAB

RIGHTS OF THE GOVERNMENT

The invention described herein may be manufactured and used by or for the Government of the United States for all governmental purposes without the payment of any royalty.

BACKGROUND OF THE INVENTION

The present invention relates generally to aerodynamic control surfaces for aircraft, and more particularly to an improved geared tab configuration for aerodynamic control surfaces. This invention is especially useful on STOL (short take-off and landing) aircraft.

STOL aircraft are characterized by low take-off and landing speeds combined with relatively high speed cruise capability. To provide the required low speed pitch maneuver capability requires a very powerful elevator. This elevator power is obtained by using a large chord elevator with larger than normal deflection angles. For example, certain STOL aircraft may require up to 35° of trailing edge up (TEU) deflection during low speed operation. In cruise, however, normal elevator deflections seldom exceed 3° to 4° although critical flight maneuvers may require as much as 10° to 15° of elevator deflection. During cruise these design requirements result in an elevator that is overly sensitive yet requires an actuator that is more powerful than normal.

What is needed is a mechanism that would simultaneously (1) reduce the large elevator hinge moments typical of moderate deflections in high speed flight; (2) reduce the elevator sensitivity for small deflections also typical of cruise; but (3) not reduce the elevator power at maximum TEU deflection used only during low speed operation. Previous geared tab machanisms have always been designed to either (1) reduce hinge moments or (2) to increase control surface effectiveness, but never to provide a combination of all three of the benefits noted above.

The novel geared tab system presented herein provides tab deflection inversely proportional to elevator deflection in the zero to maximum trailing edge down (TED) position and zero to about 13° TEU position. This reduces the elevator hinge moments and over-sensitivity for deflections typical of high speed flight. However, between 13° and 35° of TEU elevator deflection the tab motion reverses and the tab returns to the faired condition relative to the elevator at maximum TEU elevator deflection. This provides 100% elevator effectiveness at maximum TEU deflection as required for low speed operation. Tailoring elevator sensitivity and the hinge moment reduction can be controlled by appropriate variations in tab gearing and tab to elevator sizing. This design can result in an elevator actuator size reduction of 50 to 75 percent resulting in a substantial aircraft weight reduction.

It is an object of the present invention to provide an aircraft elevator geared tab system to reduce elevator sensitivity at high airspeeds while still providing maximum elevator effectiveness at low airspeeds.

It is yet another object of the present invention to reduce elevator actuator size and aircraft weight.

These and other objects of the present invention will become apparent as the detailed description of representative embodiments thereof proceeds.

SUMMARY OF THE INVENTION

In accordance with the foregoing principles and objects of the present invention, an improved geared tab configuration for a moveable airfoil, such as an elevator of an aircraft, is provided which comprises a tab pivotally connected to the airfoil, and linkage connecting the airfoil to the tab for simultaneous opposing pivotal movement of the tab relative to the airfoil to a maximum tab deflection at a determinable intermediate upward airfoil deflection beyond which the relative tab deflection reverses and fairs to the airfoil at a determinable maximum upward airfoil deflection.

DESCRIPTION OF THE DRAWINGS

The present invention will be more clearly understood from the following detailed description of a representative embodiment thereof read in conjunction with the accompanying drawings wherein.

DETAILED DESCRIPTION

Figure 1:
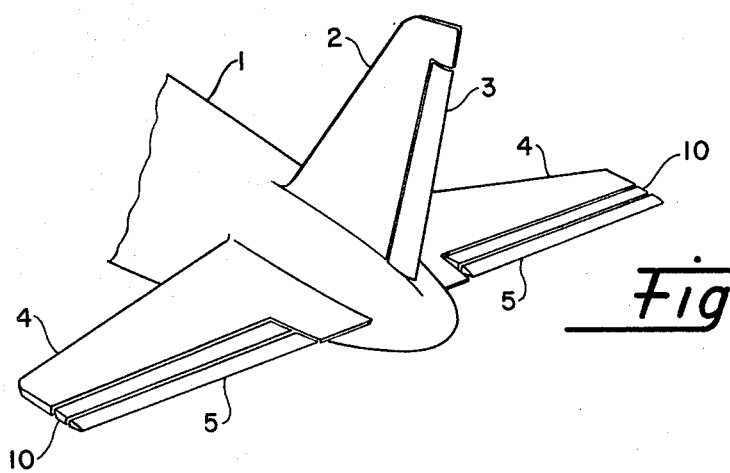
FIG. 1 is a perspective view of an aircraft tail section illustrating typical placement of geared tabs on elevators.

Referring now to the accompanying drawings, FIG. 1 presents a perspective view of a typical tail section of an aircraft 1 including vertical stabilizer 2 and rudder 3, horizontal stabilizers 4, elevators 10, and trim tabs 5. Elevators 10 may be mounted conventionally for pivotal movement relative to horizontal stabilizer 4, and geared tabs 5 may be hinged to elevators 10 for pivotal movement relative thereto. Geared tabs 5 may subtend any desirable portion of the trailing edge of elevators 10, up to substantially the entire length of elevators 10, as shown in FIG. 1.

Figure 2:
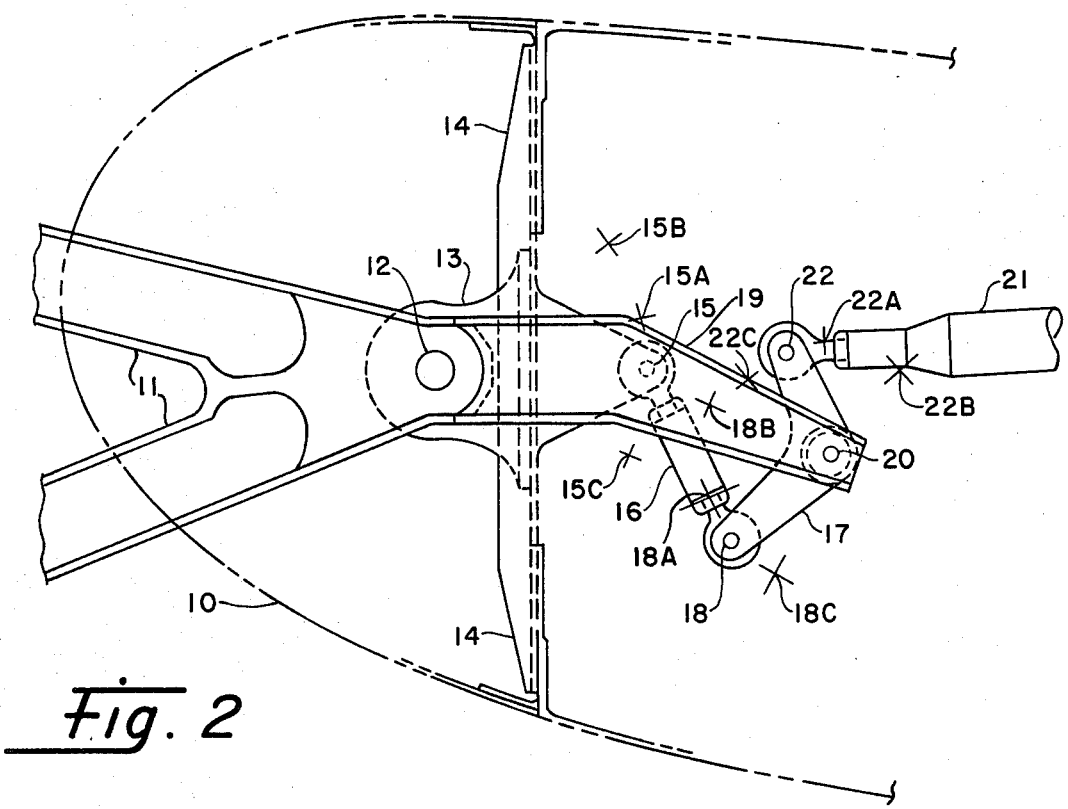
FIG. 2 is a partial cross-sectional view of the aircraft elevator of FIG. 1 illustrating one embodiment of the novel linkage means for controlling geared tab movement.
Figure 3:
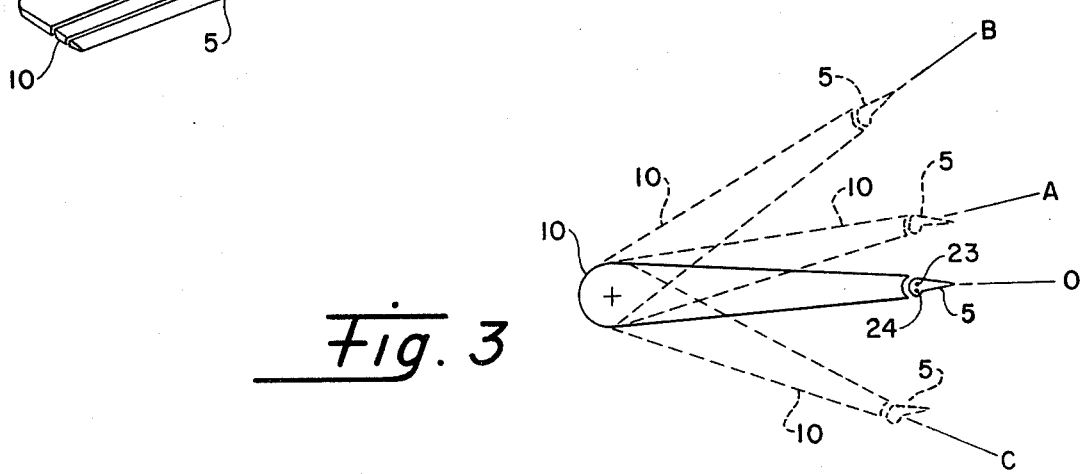
FIG. 3 illustrates representative relative positions of a geared tab for various elevator positions using the linkage of the present invention.

Referring now to FIGS. 2 and 3, FIG. 2 shows a partial cross-sectional side view of a repesentative embodiment of the novel linkage for controlling the position of the geared tab 5 as incorporated into the structure of aircraft elevator 10. FIG. 3 shows a side view of elevator 10 and tab 5 illustrating schematically their relative positions.

As shown in FIG. 2, a typical aircraft elevator 10 may be mounted conventionally to strut 11 to a forwardly disposed horizontal stabilizer 4 (as shown schematically in FIG. 1) fixed to aircraft 1. Elevator 10 is typically mounted for controlled pivotal movement, relative to the horizontal stabilizer 4, on a horizontally disposed axis defined by torque shaft 12 supported by strut 11 and journaled into a bearing support bracket 13 secured to spar 14 of the elevator 10 structure. Eccentric pin 15 in support bracket 13 pivotally interconnects one end of link 16 to bracket 13. Link 16 may be in the form of a screw and sleeve assembly to permit adjustment of its length. Link 16 is pivotally connected at its other end to one end of bell crank 17 through pin 18.

Cantilevered strut segment 19 comprises a rigid extension of strut 11 and carried near its rearward extremity pin 20 for pivotal support of bell crank 17. Strut segment 19 may, as in the nonlimiting representative embodiment shown in FIG. 2, have the angular configuration shown to facilitate placement of the component parts of the linkage mechanism shown within elevator 10. Strut segment 19 is of a length such that pin 20 is displaced from pin 15 sufficiently to allow link 16 and the lower arm of bell crank 17 to which it is connected to pivot between pins 15 and 20 as hereinbelow described.

Bell crank 17 is connected at its upper arm to connecting rod 21 for pivotal movement about pin 22. Connecting rod 21 is pivotally connected at its other end to eccentric pin 23 (see FIG. 3) of geared tab 5 on the trailing edge of elevator 10. Connecting rod 21 may include along its length a threaded length adjustment means (not shown).

FIG. 3 further shows the location of eccentric pin 23 and of means defining a pivot axis, such as torque shaft 24, about which tab 5 pivots relative to elevator 10. The relative positions of tab 5 for various deflections of elevator 10 are shown in phantom. For example, in position 0 (solid lines) elevator 10 and tab 5 are in the normal faired configuration relative to the horizontal stabilizer 4 (as in FIG. 1). Position A shows the relative positions of elevator 10 and tab 5 for an upward deflection of elevator 10 of about 13°; position B corresponds to an upward deflection of about 35° for elevator 10. Position C corresponds to a trailing edge downward deflection of elevator 10 of about 23°.

Referring now to FIG. 2 in conjunction with FIG. 3, the relative positions shown therein for link 16, bell crank 17, and connecting rod 21 defining, respectively, the locations of pins 15, 18 and 22, correspond to position 0 shown in FIG. 3. Note that the location of pin 20 remains fixed relative to strut 11 attached to horizontal stabilizer 4 (in FIG. 1) and relative to torque shaft 12 for all upward or downward deflections of elevator 10.

As elevator 10 is actuated to deflect upwardly (about torque shaft 12 and counterclockwise in the plane of FIG. 2) toward positions A and B, pin 15 (fixed relative to elevator 10) rotates toward positions labeled 15A and 15B, position 15B corresponding to a full elevator 10 upward deflection of about 35°. By reason of the interconnection of link 16, bell crank 17 and connecting rod 21, pin 18 will rotate clockwise toward the corresponding positions labeled 18A and 18B, and pin 22 to the corresponding positions labeled 22A and 22B. Consequently, connecting rod 21 and pin 23 are translated rearwardly relative to shaft 12 resulting in a downward deflection of tab 5 relative to elevator 10. It is seen, however, that by suitable adjustment of the lengths of link 16 and connecting rod 21 and correspondingly suitable sizing of bell crank 17, and by reason of the eccentricity of the pivotal points defined by shaft 12, and pins 15, 18, 20 and 22, the radial displacement of poin 23 relative to shaft 12 may be made to traverse a maximum beyond which, with increasing upward deflection of elevator 10, tab 5 will return to the faired condition at some elevator position such as represented by position B of FIG. 3. In the embodiment shown substantially to scale in FIG. 2, position B at which tab 5 returns to the faired configuration, corresponds to an upward deflection of the trailing edge of elevator 10 of the maximum desirable of about 35°. Fairing of tab 5 to elevator 10 at this deflection provides maximum elevator effectiveness. The maximum deflection of tab 5 relative to elevator 10 for the scaled linkage configuration shown in FIG. 2 occurs at approximately 13° (position A) well beyond any deflection anticipated for normal control during cruise flight (normally ±4°). Therefore, the novel linkage configuration shown in FIG. 2 provides both maximum elevator effectiveness for low speed operation and hinge moment reduction and sensitivity relief during cruise and high speed flight.

Correspondingly, the configuration as shown in FIG. 2 provides for a maximum downward deflection of elevator 10 of approximately 23°, well beyond anticipated control for normal flight. As elevator 10 deflects downwardly, pin 15 rotates toward the position indicated at 15C, pin 18 rotates toward position 18C, pin 22 rotates toward position 22C, and connecting rod 21 is translated forwardly causing tab 5 to pivot upwardly relative to elevator 10 toward the position C depicted in FIG. 3. Note that for an increasingly downward deflection of elevator 10 to about 23° (position C of FIG. 3), the relative deflection of tab 5 is increasingly upward and passes through no maximum, thereby providing hinge moment relief for all downward deflections of elevator 10.

It may be desirable to provide more than one control linkage assembly, such as shown in FIG. 2, for each elevator 10 and tab 5 for a given aircraft in order to facilitate elevator and tab control. Further, it is understood that the size and arrangement of the component parts of the linkage arrangement disclosed herein may be altered to accommodate a different set of characteristic conditions corresponding to maximum trailing edge up elevator deflection (faired position B of FIG. 3), maximum downward tab deflection (position A) and downward elevator deflection (position C) of the embodiment shown herein, without departing from the scope of this invention. It is further noted that the novel control linkage disclosed herein may have broad application including tabs mounted on airfoils other than elevators. Therefore, all embodiments and applications thereof contemplated hereunder have not been shown in complete detail. Other embodiments may be developed without departing from the spirit of this invention or from the scope of the appended claims.

We claim:

1. An aerodynamic geared tab system for an aircraft which comprises:
   a. an airfoil mounted for pivotal movement, about a first axis fixed relative to said aircraft, between predetermined first and second angular limits;
   b. a geared tab mounted for pivotal movment about a second axis fixed relative to said airfoil and displaced from said first axis, said tab and airfoil having a first substantially faired condition relative to each other at a first angular position of said airfoil intermediate said first and second angular limits; and
   c. linkage means, interconnecting said aircraft, airfoil and tab, and including a bell crank mounted to said aircraft for rotation about a third axis substantially parallel to said first axis and intermediate said first and second axes, a link pivotally connected at a first end thereof to a first end of said bell crank and at a second end thereof to said airfoil at a point intermediate said first and third axes, and a connecting rod pivotally connected at a first end thereof to a second end of said bell crank and at the second end thereof to said tab, said bell crank, link and connecting rod sized for counter-pivoting said tab, in response to pivotal movement of said airfoil, between a first maximum angular deflection of said tab relative to said airfoil near said first angular limit and an oppositely disposed second maximum angular deflection of said tab relative to said airfoil at a second angular position of said airfoil intermediate said first angular position and said second angular limit, and for pivoting said tab, in response to pivotal movement of said airfoil, between said second maximum angular deflection of said tab and a second substantially faired condition of said tab and airfoil near said second angular limit.

2. An aerodynamic geared tab system for an aircraft which comprises:
   a. an airfoil mounted for pivotal movement about a first axis fixed relative to said aircraft;
   b. a geared tab mounted for pivotal movement about a second axis fixed relative to said airfoil and displaced from said first axis; and
   c. linkage means, interconnecting said aircraft, airfoil and tab, for pivoting said tab relative to said airfoil in response to movement of said airfoil, said linkage means including a bell crank mounted for rotation about a third axis fixed relative to said aircraft and substantially parallel to said first axis and inermediate said first and second axes, a link operatively interconnecting a first end of said bell crank to said airfoil at a point intermediate said first and third axes for counter-rotating said bell crank in response to pivotal movement of said airfoil, and a connecting rod operatively interconnecting the second end of said bell crank to said tab for pivotal movement of said tab in response to rotation of said bell crank.

3. The aerodynamic geared tab system as recited in claim 2, wherein said pivotal movement of said airfoil is confined between predetermined first and second angular limits, said airfoil and tab having a first faired condition relative to each other at a first angular position intermediate said limits, and said link, bell crank, and connecting rod are sized to interconnect said tab, bell crank and airfoil to provide pivotal movement of said tab to a maximum deflection, relative to said airfoil, intermediate said first angular position and said second angular limit and to a second substantially faired condition near said second limit.

* * * * *